M. BEHRER.
VEHICLE TIRE.
APPLICATION FILED AUG. 16, 1907.
928,731. Patented July 20, 1909.
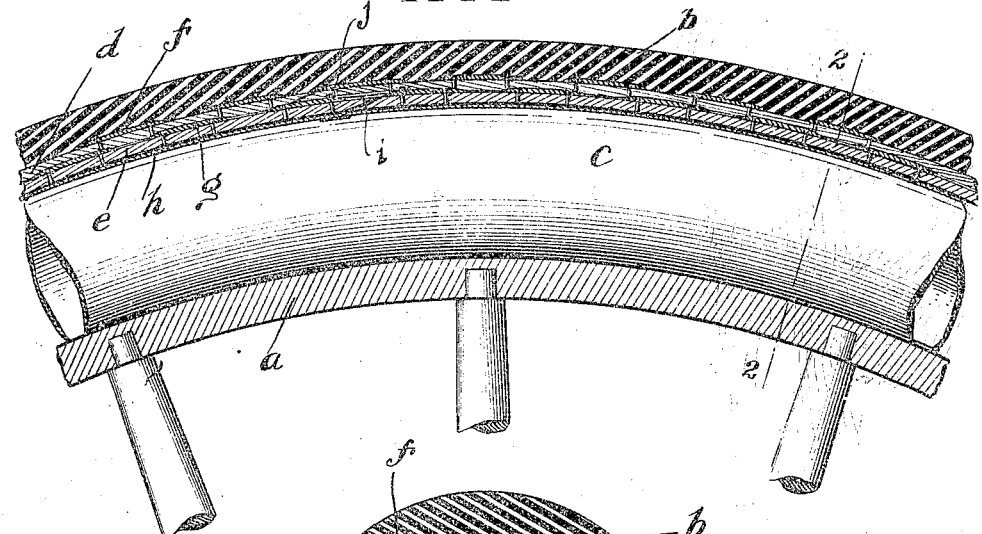
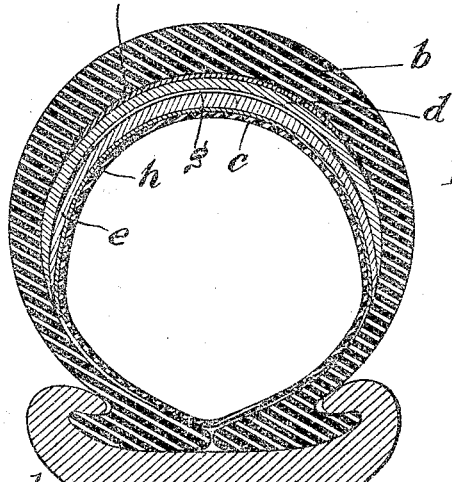
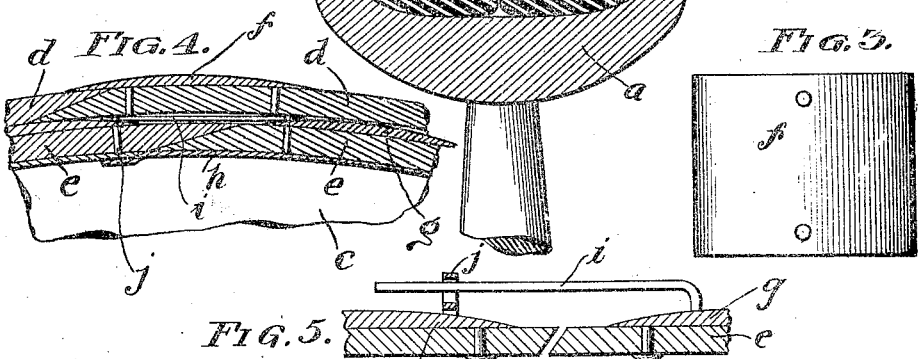
Attest:
J. O. Mitchell
J. G. Sands
Inventor:
Martin Behrer
by Frothingham & Wentworth
his Attys.

UNITED STATES PATENT OFFICE.

MARTIN BEHRER, OF NEW YORK, N. Y.

VEHICLE-TIRE.

No. 928,731.    Specification of Letters Patent.    Patented July 20, 1909.

Application filed August 16, 1907. Serial No. 388,771.

*To all whom it may concern:*

Be it known that I, MARTIN BEHRER, a citizen of the United States, residing at Queens, in the borough of Queens, city of New York, county of Queens, and State of New York, have invented certain new and useful Improvements in Vehicle-Tires, of which the following is a specification, reference being had therein to the accompanying drawings, which form a part thereof.

My invention relates to vehicle tires and more particularly to that class thereof known as inner tube pneumatic tires.

The main object of the invention is to provide a tire of this character wherein the inner tube will be protected by a metallic sheathing in a manner to prevent nails, glass or other sharp substances or articles passing through the outer shoe or tread and cutting said inner tube, while being flexible to an extent to avoid a loss in the resiliency of the tire.

A further object is to provide a tire employing a protecting metallic sheathing for the inner tube wherein the metallic parts of the sheathing will be so protected as not to come into contact with the inner tube, thus avoiding all likelihood of the metallic parts cutting the material of said inner tube through that movement of parts relative to each other incidental to the use of the tire.

A still further object is to provide a tire of this character, wherein the protecting sheathing is capable of automatic elongation to adapt itself to that variance in the circumference of the tread due to a loss of the elasticity of the material therein through the wear or the aging thereof.

A further object is to provide a tire wherein a continuous metallic barrier will be interposed between the inner tube and the tread, comprised of a plurality of protecting plates each of which is capable of depression independently of every other, thus affording a yielding body which will give at any point.

A still further object is to provide a tire of this character having an inner facing for the shoe carrying a plurality of independent plates spaced apart one from the other and staggered to present in the aggregate a continuous metallic barrier or sheathing back of the tread, the ends of which facing are united by a slip joint to prevent the overlapping of the adjoining ends of said facing, or the end of any plate being forced into the inner tube by the depression of the tire at the point of jointure of the ends of the sheathing strip or strips.

A still further object is to provide a metallic sheathing for the tread of vehicle tires which is separable from the tire in a manner to permit it to be incorporated in any tire of this type, and to be removed from one shoe and placed in another.

A still further object is to provide a device of this character which, while presenting a continuous metallic barrier will have the desired flexibility and will be capable of being inexpensively produced.

The invention consists in such novel features of construction and combination of parts as are hereinafter set forth and described and more particularly pointed out in the claims hereto appended.

Referring to the drawings: Figure 1 is a longitudinal section of a part of a vehicle tire embodying my invention; Fig. 2 is a cross section on the line 2—2 Fig. 1, on a slightly larger scale; Fig. 3 is a detail view of one of the plates removed from the flexible strip, Fig. 4 is a detail view showing the slip joint between the adjoining ends of the sheathing strip, and Fig. 5 is an enlarged detailed sectional view illustrating the slip joint between the adjoining ends of the sheathing strip.

Like letters refer to like parts throughout the several views.

In the accompanying drawings, *a* indicates a felly of ordinary construction, *b* a shoe also of ordinary construction, adapted to be attached thereto in the usual and well known manner, and *c* an inner tube of the usual and well known type. In tires of this type, as now generally made, the shoe *b* is made of rubber and canvas, and the inner tube *c* of rubber alone. Various anti-skidding appliances are in common use and metal is sometimes embedded in the shoe for this purpose. This well known construction and arrangement of tire in use is subject to frequent puncture, the weight placed thereon, the rapid rotation, and the weak spots of the shoe developed through imperfect curing, wear, etc. readily permitting the penetration of the outer shoe and the tearing of the inner tube. I am aware that various expedients have been advocated to overcome this trouble, but it is impracticable to mold solids in the rubber, as commonly suggested, and a continuous body made up of overlapped hinged sections has also proven impracticable. In most instances, also, it has been the effort to make the guard an integral part of the shoe or of the inner tube, thus necessitating the manufacture of a special tire throughout.

In carrying out my invention, I employ a flexible strip carrying thereon a plurality of steel or other metallic plates, each plate being entirely independent of every other. These plates I arrange in parallel rows on different planes, and the plates on one plane are staggered with relation to those on the other with overlapping ends, thus presenting a continuous metallic barrier made up of a plurality of units each of which is capable of independent depression with the rotation of the tire. Preferably the flexible strip referred to comprises two strips of flexible tough material $d$, $e$, preferably leather, upon the upper face of each of which is attached by any desired means as rivets a plurality of steel plates $f$ $g$. The length of the strips $d$ $e$ will vary with the diameter of the tire with which they are to be used, and the ends of the said strips will be joined by slip joints broken relative to each other, means which will be hereinafter described, being provided to prevent said ends from overlapping or projecting into the inner tube.

The plates $f$ $g$ are curved transversely to conform to the contour of the shoe $b$ and the upper surface of each plate is chamfered longitudinally to avoid sharp edges which might tend to cut or wear into said shoe, or be forced through the leather strip into the inner tube. The plates $f$ are spaced apart equally about the strip $d$ and the plates $g$ similarly positioned on the strip $e$ below the spaces between the plates $f$, an arrangement which forms a supple joint between each of the adjacent plates and a non-puncturable protecting plate therefor. The strips when so equipped with plates, and set as described are secured together in any desired manner, as by stitching or the use of leather cement, rivets, etc. with the plates on the outer face of each, thus causing the strip $d$ to cover the plates $g$, and the strip $e$ to protect the inner tube therefrom. To avoid any possibility of the securing rivets, for the plates, when such are used, penetrating the inner tube, I preferably provide the inner face of the strip $e$ with a canvas facing $h$, coincident therewith.

In order to permit that longitudinal play of the sheathing necessary to have it accommodate itself to the action of the shoe $b$, I reduce and overlap the ends of the strips $d$ $e$ in any desired manner. In the drawings, I have shown each strip $d$ $e$ as having beveled overlapping ends which is a convenient and satisfactory manner of forming such a joint.

Owing to a possibility of one end of the strip $e$ being forced into the inner tube, I provide means holding the abutting ends of the sheathing strip in alinement. This means preferably comprises a rod or plate $i$ carried by one plate $g$ adjacent to one end of the strip $e$, and passing through a keeper $j$ carried by another plate $g$ adjacent to the other end of said strip. This construction permits movement of the two plates $g$ above referred to, but limits their depression independently to such an extent as to prevent a plate from cutting into the inner tube, or a substantial overlapping of the abutting ends of the strip.

The operation of the tire heretofore described is substantially as follows: The sheathing strip having been placed in the shoe between it and the inner tube, the tire is inflated, in the usual manner, the said sheathing acting as a lining for the said shoe, and being held firmly in place by the inflation of the inner tube. If such inflation causes the shoe to give, or if said shoe gives while the tire is in use to an extent to increase its circumference, the adjoining ends of the strips $d$ $e$ will slide upon each other sufficiently to elongate said sheathing strip to the same extent. As weight is placed upon the tire at any point, the tread and inner tube flatten adjacent to that point, and the sheathing strip by reason of the supple joint formed by the flexible strips $d$ $e$ between the plates $f$ $g$, gives correspondingly, the length of said plates permitting one or more to give to conform to the configuration assumed by the depressed portion of the tire. If the point under depression be at the point of the ends of the sheathing strip, there would be a tendency of the ends to separate and be forced end on inwardly to an extent to permit the inner tube $c$ entering between them, or the cutting of said tube by the said ends or the plates thereon which are adjacent thereto. The rod or plate $i$ however, will cause both ends to move in unison, thus avoiding such an action.

If the tire should pick up a nail, piece of glass or other similar article, it will be observed that the plates $f$ $g$ would receive the impact thereof after it had passed through the shoe, and prevent its entering the inner tube. Incidentally the strip between the plates $f$ would of itself offer resistance to the passage of the article therethrough.

The ends of the plates $f$ $g$ being overlapped affords ample protection in case a nail should enter the boot at an angle, in addition to permitting the plates to be spaced sufficiently apart to permit that movement necessary to permit the sheathing strip to conform to the movement of the shoe as described.

The leather or other tough material of the strips $d$ $e$ serves to prevent the plates $f$ $g$ cutting into the inner tube, or gradually working loose, which would occur were they embedded in rubber. The shoe is sufficiently tough to withstand the wearing action of the said plates th... .on.

In the drawings the various parts are not shown to scale, such drawings, owing to the difficulties of properly showing the invention being merely an approximate illustration of the invention.

It is not my intention to claim a metallic sheathing for inner tube tires broadly, but I believe that it is new to provide a plurality of segmental metallic plates carried by a flexible strip on different planes, those on one plane being overlapped with those on another and the abutting ends of said strips being connected by a slip joint having a keeper preventing said edges being turned inwardly, and I intend to claim such broadly.

Having described the invention, what I claim and desire to have protected by Letters Patent is:—

1. In a vehicle tire, the combination of a shoe, an inner expansible tube, and a sheathing disposed between said shoe and said inner tube, having its ends united by a slip joint, a plurality of plates secured to said sheathing on different planes, the plates on one plane overlapping those on the other, a plate or rod carried by a plate adjacent to one end of said sheathing, and a keeper for said plate or rod carried by a plate adjacent to the other end of said strip whereby said ends are held in substantial alinement.

2. In a vehicle tire, a sheathing adapted to be secured to a tire, comprising a plurality of strips of flexible leather, a plurality of segmental plates attached to the outer face of each said strip, said strips being so positioned relative to each as to bring the plates on one strip below the spaces between the plates on the other strip, with the ends of the plates on one strip overlapping those on the other, a keeper carried by the plate adjacent to one end of said strips, and a rigid plate or rod carried by the plate adjacent to the other end of said strips, whereby a slip joint is formed and the ends of the strip are held in substantial alinement.

In witness whereof, I have hereunto affixed my signature this 14th day of August, 1907, in the presence of two witnesses.

MARTIN BEHRER.

Witnesses:
F. T. WENTWORTH,
P. V. WENING.